(12) United States Patent
Laan

(10) Patent No.: US 9,661,351 B2
(45) Date of Patent: May 23, 2017

(54) CLIENT SIDE FRAME PREDICTION FOR VIDEO STREAMS WITH SKIPPED FRAMES

(71) Applicant: Sony Computer Entertainment America LLC

(72) Inventor: Roger Van der Laan, Redwood City, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 366 days.

(21) Appl. No.: 13/838,982

(22) Filed: Mar. 15, 2013

(65) Prior Publication Data

US 2014/0269918 A1    Sep. 18, 2014

(51) Int. Cl.
| | |
|---|---|
| *H04N 19/895* | (2014.01) |
| *H04N 19/105* | (2014.01) |
| *H04N 19/172* | (2014.01) |
| *H04N 19/166* | (2014.01) |
| *H04N 19/65* | (2014.01) |
| *H04N 19/587* | (2014.01) |

(52) U.S. Cl.
CPC ......... *H04N 19/895* (2014.11); *H04N 19/105* (2014.11); *H04N 19/166* (2014.11); *H04N 19/172* (2014.11); *H04N 19/587* (2014.11); *H04N 19/65* (2014.11)

(58) Field of Classification Search
None
See application file for complete search history.

(56) References Cited

U.S. PATENT DOCUMENTS

| | | | |
|---|---|---|---|
| 2005/0129128 A1* | 6/2005 | Chou | H04N 19/597 375/240.18 |
| 2008/0240248 A1* | 10/2008 | Lee et al. | 375/240.16 |
| 2009/0148058 A1* | 6/2009 | Dane et al. | 382/251 |
| 2011/0228845 A1* | 9/2011 | Banerjee | 375/240.07 |
| 2013/0329809 A1* | 12/2013 | Leontaris | H04N 21/44209 375/240.25 |

* cited by examiner

*Primary Examiner* — Anner Holder
*Assistant Examiner* — William Adrovel
(74) *Attorney, Agent, or Firm* — Martine Penilla Group, LLP

(57) ABSTRACT

A method for delivering video over a network includes encoding, by a server, a sequence of video frames as a compressed video stream comprising an initial I-frame followed by a plurality P-frames, the sequence having a skipped frame which is not encoded. The compressed video stream is transmitted over a network to a client device, the skipped frame not being transmitted. In response to detecting the skipped frame, the client device generating a predicted frame that replaces the skipped frame in the compressed video stream, the predicted frame being generated based on extending delta information from one or more previous frames decoded by the client device.

14 Claims, 9 Drawing Sheets

CLIENT SIDE FRAME PREDICTION FOR VIDEO STREAMS WITH SKIPPED FRAMES

TECHNICAL FIELD

The present disclosure relates generally to transmission of compressed video over computer networks; more specifically, to methods and apparatus for mitigating the effects of dropped or skipped frames that are not encoded.

BACKGROUND

Remote hosting of online, fast-action, interactive video games and other high-end video applications typically requires very low latencies. For example, for twitch video games and applications, low round-trip latency, as measured from the time a user's control input is sent to the hosting service center to the time that the newly generated video content appears on the screen of the user's client device, is typically required. At higher latencies, performance suffers noticeably. Achieving such low latencies over the Internet or other similar networks requires the video compressor at the hosting service to generate a packet stream with particular characteristics such that the packet sequence flowing through the entire path from the hosting service to the client device is not subject to delays or excessive packet loss. In addition, the video compressor must create a packet stream which is sufficiently robust so that it can tolerate the inevitable packet loss and packet reordering that occurs in normal Internet and network transmissions.

In streaming video technologies, lost or dropped packets can result in highly noticeable performance issues, potentially causing the screen to completely freeze for a period of time or show other visual artifacts (e.g., jitter). If a lost/delayed packet causes the loss of a key frame (i.e., I-frame), then the decompressor on the client device will lack a reference for all of the P-frames that follow until a new I-frame is received. Similarly, if a P frame is lost, that will impact the P-frames that follow. Depending on how long it will be before an I-frame appears, this can have a significant visual impact. (As is well-known, I-frames are the only type of frame that is not coded with reference to any other frame. P-frames are coded predicatively from a previous I-frame or P-frame; B-frames are coded predicatively from I-frames and P-frames. In order to be properly decoded, a B-frame associated with a group of pictures ("GOPs") may need to reference the I-frame of a next GOP. In the context of the present disclosure, the term "I-frame" is intended to broadly refer to an Inter-frame and its equivalents, e.g., an IDR frame in the case of H.264.)

Another problem that arises when transmitting a packet stream at full data rate is that sometimes video frames are dropped or skipped (both terms are used synonymously in the present disclosure) because the bandwidth budget is exceeded by previous frames. Dropped or skipped frames are never encoded. Even though the encoded stream remains contiguous, dropping or skipping frames can still result in visual artifacts that adversely affect the end-user's viewing experience.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

DESCRIPTION OF EXAMPLE EMBODIMENTS

Figure 1:
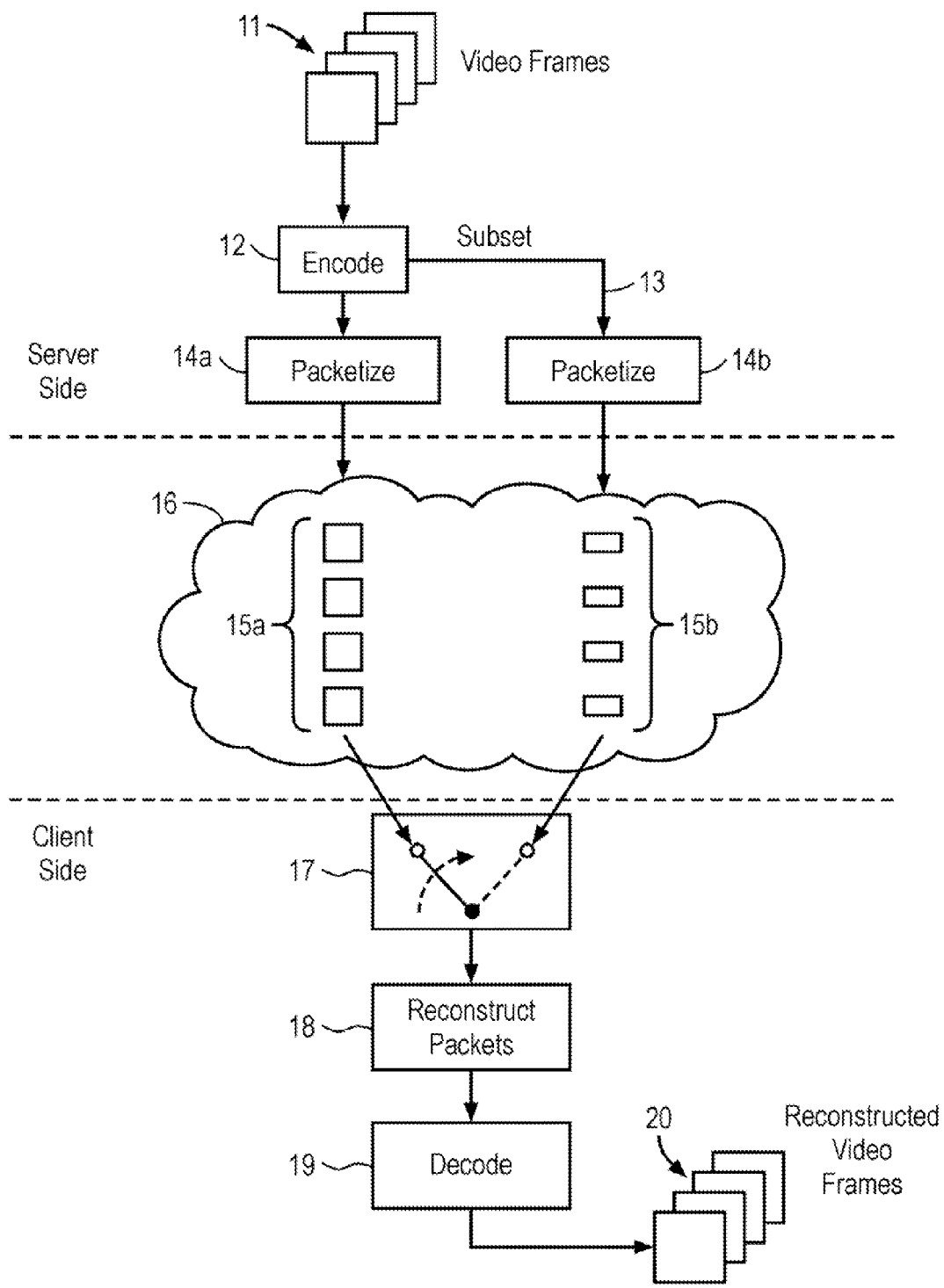
FIG. 1 is an example network diagram illustrating one embodiment for effectively dealing with packet loss.

In the following description, numerous specific details are set forth in order to provide a thorough understanding of the embodiments described. It will be apparent, however, to one having ordinary skill in the art that the specific details may not be needed to practice the embodiments described. In other instances, well-known apparatus or methods have not been described in detail in order to avoid obscuring the embodiments disclosed.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art.

In the context of the present disclosure, a video "encoder" broadly refers to a device, circuit or algorithm (embodied in hardware or software) that compresses (i.e., encodes) video data using fewer bits/bytes to reduce the size of the original video data. Data compression is also frequently referred to as source coding, i.e., coding of data performed at the source before it is either transmitted or stored. Conversely, a video "decoder" or decompressor is a device, circuit or algorithm which performs the reverse operation of an encoder, undoing the encoding to retrieve the original (decompressed) video data.

The term "server" broadly refers to any combination of hardware or software embodied in a computer (i.e., a processor) designed to provide services to client devices or processes. A server therefore can refer to one or more computer processors that run a server operating system from computer-executable code stored in a memory, and which is provided to the user as virtualized or non-virtualized server; it can also refer to any software or dedicated hardware capable of providing computing services.

A "client device" refers a computer device such as a PC, desktop computer, tablet, mobile, handheld, set-top box, or any other general purpose computer (e.g., Microsoft Windows- or Linux-based PCs or Apple, Inc. Macintosh computers) having a wired or wireless connection to a public network such as the Internet, and which further includes the ability to decompress/decode compressed packet data received over a network connection. The client device may include either an internal or external display device for displaying one of the many digital images (compressed or uncompressed) which comprise a movie or video (i.e., a live or moving picture).

A video "frame" refers one of the many digital images (compressed or uncompressed) which comprise a movie or video (i.e., a live or moving picture). When video is displayed, each frame of the moving picture is flashed on a screen for a short time (nowadays, usually ¼24, ¼25, ⅓30 or ⅙60 of a second) and then immediately replaced by the next one. The human attribute of persistence of vision blends the frames together, such that a view perceives a live, or real-time moving picture. A frame can be divided up into regions of an image, which are commonly referred to as "tiles" or "slices." For instance, in the H.264/AVC standard a frame can be composed of a single slice or multiple slices.

In the context of the present disclosure, the term "packet loss" refers broadly to the occurrence of when one or more packets travelling across a computer network fail to reach their destination, or when one or more packets transmitted over a network arrive at their destination with errors.

FIG. 1 is an example network diagram illustrating one embodiment for effectively dealing with packet loss. As shown, a plurality of video frames 11 is compressed (coded) by an encoder 12 to produce a primary stream of compressed video data as well as a subset stream containing key minimal data. Key data would differ among embodiments and would depend on specific application. The additional stream may be transmitted at considerably lower bitrates than the normal stream. The subset stream, or sub-stream, is shown by arrow 13. After encoding, the primary and subset streams are packetized by packetize devices 14a and 14b, respectively, before being transmitted, substantially simultaneously, to the client over network 16. Thus, for every slice, the hosting service not only sends the normal video stream, but also a subset of that stream in separate network packets.

In one embodiment, the subset stream contains only motion vectors. In another embodiment, subset stream contains motion vectors and residuals. Motion vectors represent the spatial displacement (i.e., "delta") between two successive image areas. e.g., frame-to-frame.

In the embodiment shown, information that leads to one possible encoding (i.e., motion vectors/residuals) is separated from the actual encoding, and then sent downstream so that the decoder may make best use of it as can in the event that packet loss occurs. In other words, the decoder may utilize the motion vectors to construct the frame as best as possible. Practitioners in the art will appreciate that the additional sub-stream may be transmitted at considerably lower bit rates than the normal or primary stream. This is represented in FIG. 1 by the smaller-sized sub-stream packets 15b shown being transmitted over network 16, as compared with the primary packet stream 15a.

On the client side, both the primary stream and the sub-stream are received at switching device 17, which may comprise a router, switch, or other network switching device that may be used to select between the primary and sub-stream. Switching device 17 normally selects the primary stream, which is then fed into packet reconstruction device 18. The reconstructed packets are then decoded by the decoder 19 to produce the reconstructed video frames 20 for display on the client device. In the event that packet loss is detected, switching device 17 switches from the primary stream to the sub-stream. The sub-stream information is used by decoder 19 to make a prediction of, or otherwise reconstruct, the desired frame. Afterwards, switching device 17 switches back to the normal or primary packet stream.

Figure 2:
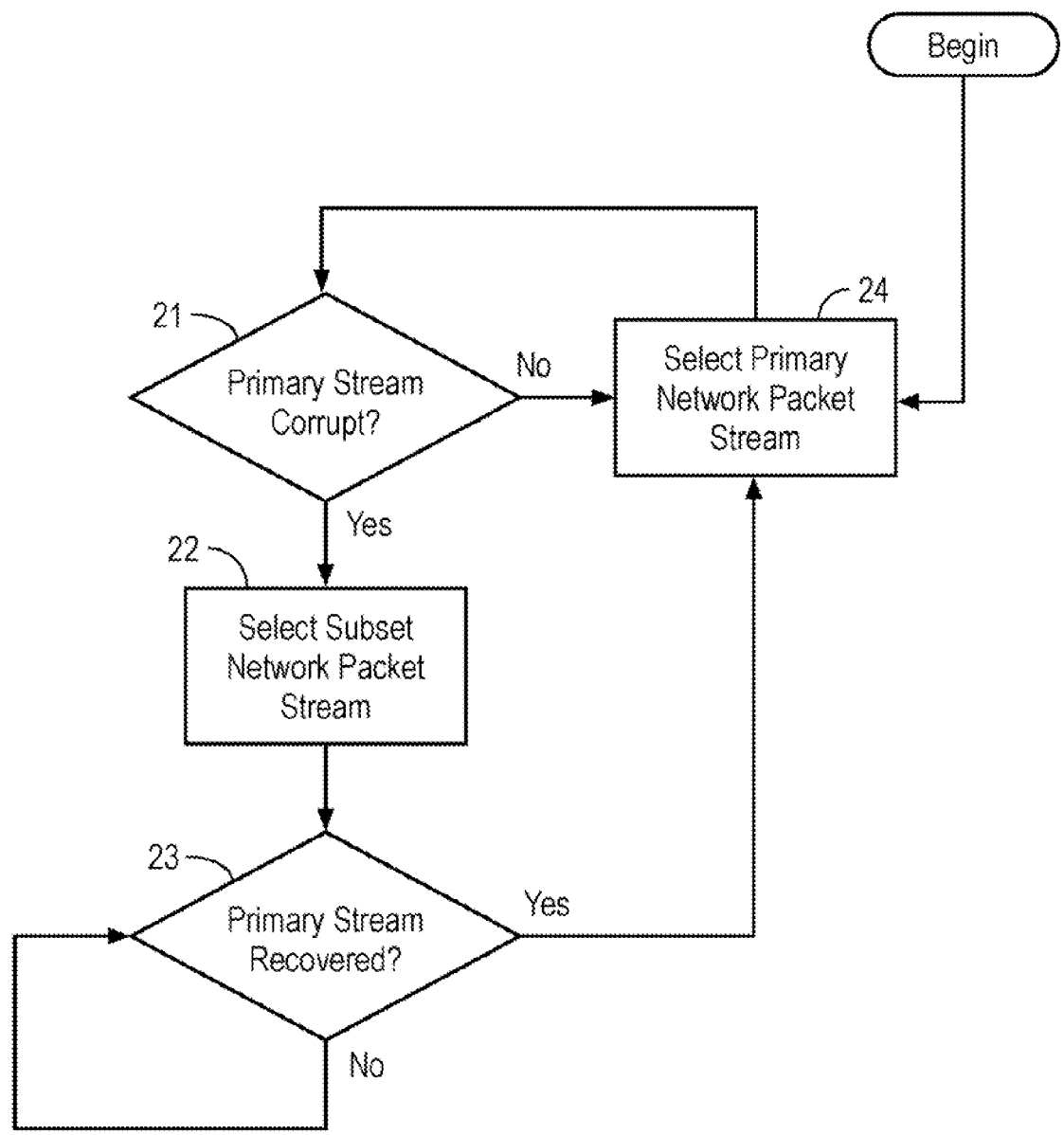
FIG. 2 is a flow diagram illustrating an example method for dealing with packet loss.

FIG. 2 is a flow diagram illustrating an example method for dealing with packet loss in correspondence with the network diagram of FIG. 1. The process may begin at block 24 with the arrival of a network packet, followed by the client-side device detecting whether the primary packet stream is corrupt. If it is not corrupt, the primary network packet stream continues to be selected (block 24) for subsequent decoding and rendering of reconstructed video frames on the client display device. On the other hand, if the primary stream is corrupted by a dropped or lost packet then the subset network packet stream is selected (block 22). The subset data are decoded and used to reconstruct the desired frame. This process may continue as long as the primary stream remains corrupt. At decision block 23, once the primary stream is recovered or is no longer corrupted (block 23) the primary network packet stream is once again selected and the normal packets are decoded, as described above.

Figure 3:
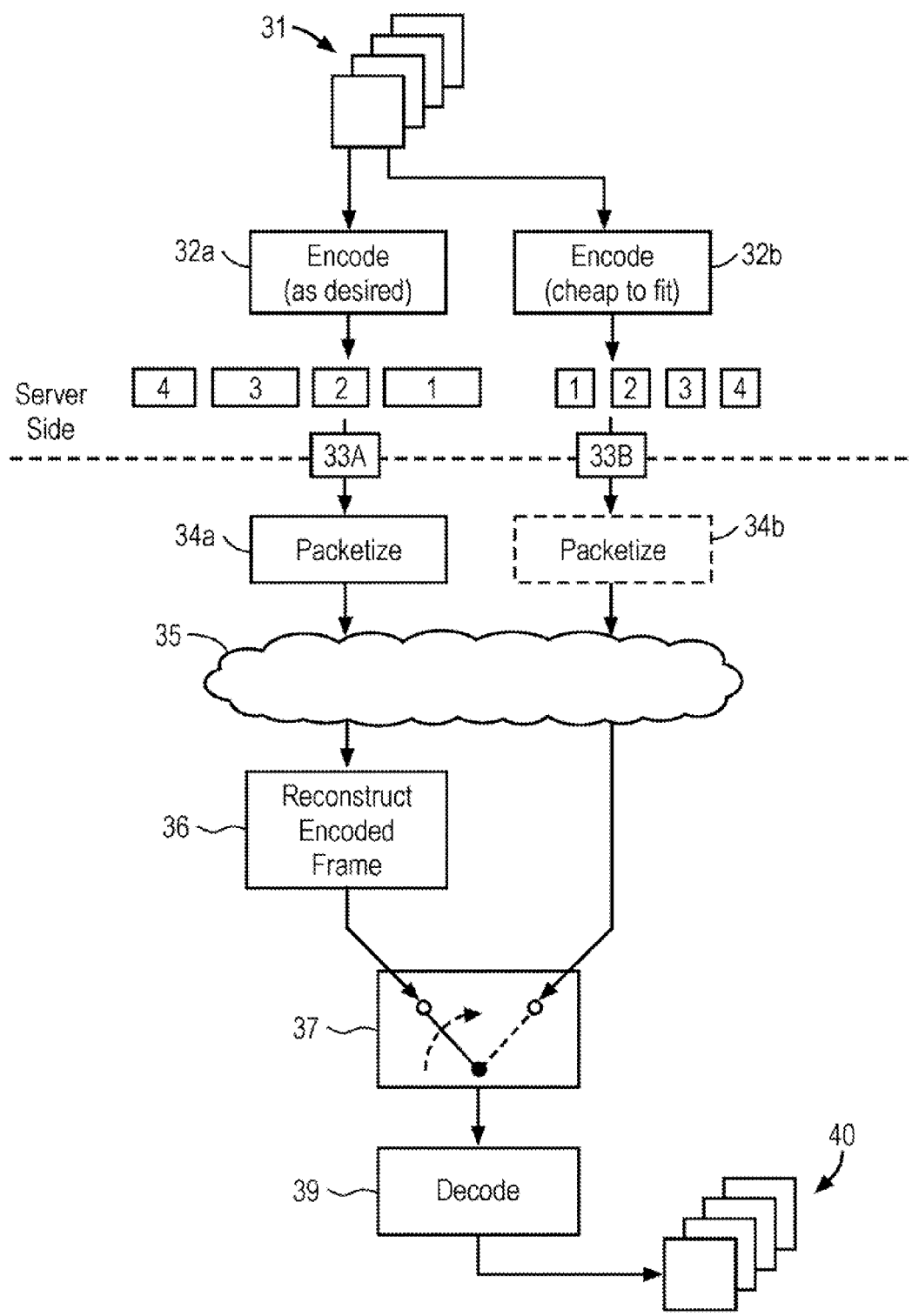
FIG. 3 is another example network diagram illustrating an embodiment for handling packet loss.

FIG. 3 is another example network diagram illustrating an embodiment for handling packet loss that is similar to that shown in FIG. 1. In this example, video frames 31 are encoded as desired by encoder 32a to produce a primary or normal video stream 33a. In addition, a separate encoding generates a less ideal stream 33b with each frame based on the previous frame of the primary stream but with the quality scaled such that a slice or frame neatly fits into a predetermined set of network packets, which could be a single packet. The normal video stream is packetized by packetizer 34a and transmitted over network 35. The secondary stream is also packetized for transmission over network 35. It is appreciated that the bandwidth of the secondary stream may be much lower as compared to the normal video stream.

At the client-side device, the encoded primary stream frames are reconstructed by a device 36 to replicate video stream 33a. A switching device 37 is utilized to select between the normal video stream and the secondary video stream. Whichever stream is selected, the received packets are then decoded by a decoder 39 to generate reproduced video frames 40 on the display of the client device. As in the previous embodiment, if a packet loss is detected on the client-side device, the secondary stream is selected by switching device 37. When the primary stream transmission recovers, the video stream switching device 37 switches back the primary or normal video stream.

It is appreciated by practitioners in the art that in order to maintain synchronicity between the client-side decoder and the server-side decoder (not shown), the client device may notify the server-side when it switches over to the secondary video stream. When lost or corrupted data packets have been detected and switching device 37 has selected the secondary stream, a processor associated with the client device utilizes the secondary video stream to construct a lower-quality, yet accurate, representation of the video frames.

Figure 4:
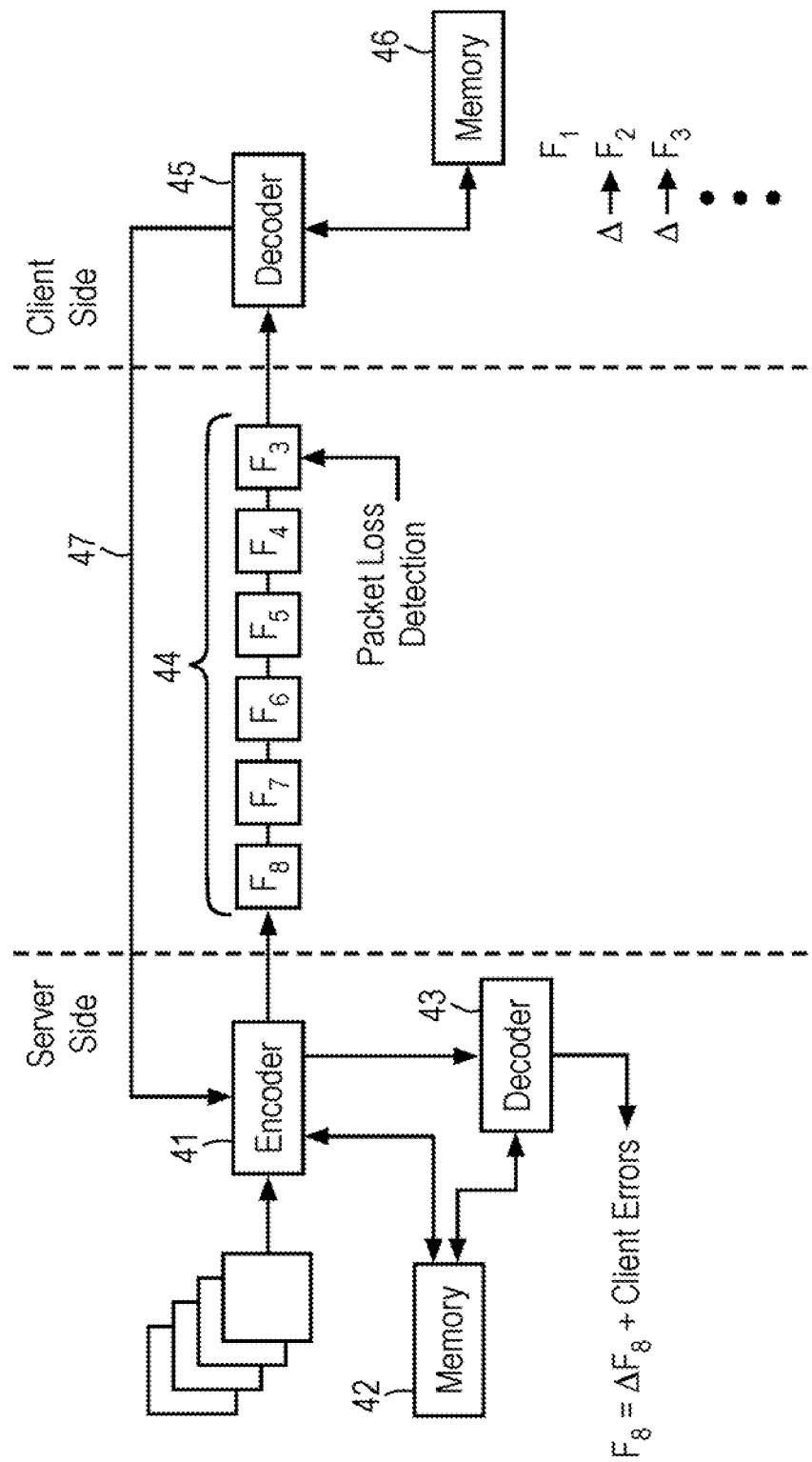
FIG. 4 is yet another example network diagram illustrating an embodiment for handling packet loss.

FIG. 4 is yet another example network diagram illustrating an embodiment for handling packet loss. In the embodiment shown, the server-side encoder 41 stores a copy of the encoded bits per slice/frame in an associated memory 42 (e.g., RAM, disk, etc.). These encoded frames may then be retrieved and individually decoded by decoder 43 for reconstruction of the client-side state. In this manner, encoder 41 can continue to feed encoded slices/frames to the client-side decoder 45, which is coupled to its own associated memory 46, even after packet loss. When packet loss does occur, decoder 45 (or a processor coupled with decoder 45) sends a notification to encoder 41 (or a processor controlling encoder 41) via feedback channel or loop 47. In response to the notification of packet loss, encoder 41 can utilize decoder 43 and the stored encoded bits/frames to determine exactly what happened at decoder 45 on the client side. In this way, the server can keep itself aware of client state even when the client has received erroneous transmissions.

In the example shown in FIG. 4, encoder 41 has encoded frames $F_1$-$F_7$ and sent them over a transmission network to the client device. By way of example, the first frame, $F_1$, may be an I-frame, followed by a sequence of P-frames that are calculated predictively based on a difference or delta (Δ) from the previous I-frame or P-frame. Thus, the second frame, $F_2$, is decoded as a delta from $F_1$, the third frame, $F_3$, is decoded as a delta from $F_2$, and so on. As shown, the third frame, $F_3$, is lost or corrupted. When this is detected at decoder 45, a notification is sent to encoder 41 via feedback loop 47, notifying encoder 41 that the last good frame received was $F_2$. In response to the notification, server-side encoder 41 generates the eighth frame, $F_8$, predictively as a delta from the last good frame, $F_2$. To do this and maintain state synchronicity between the server and client sides, encoder 41 constructs $F_8$ from $F_2$, taking into account all of the client errors resulting on the client-side due to the loss of $F_3$, and the subsequent frames. Utilizing decoder 43 and the stored encoded bits in memory 42, encoder determines exactly what each of the packets subsequent to the lost packet (e.g., $F_4$-$F_8$) would look like, taking into consideration the client-side errors that have occurred.

Figure 5:
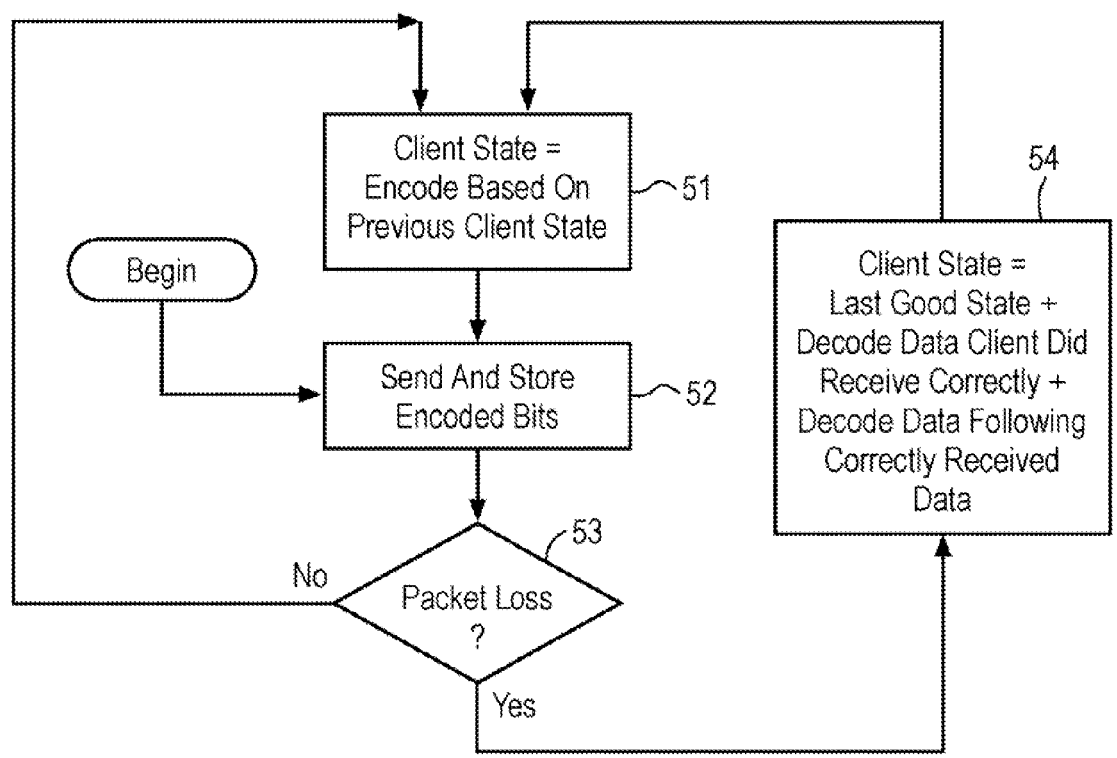
FIG. 5 is a flow diagram illustrating another example process flow for handling packet loss.

FIG. 5 is a flow diagram illustrating an example process flow wherein the server-side encoder keeps encoding frames for reconstruction of the client state following packet loss. With the server-side encoder having transmitted an I-frame, the next frame (e.g. P-frame) is encoded based on the previous client state. (Block 51) At block 52, the server-side encoder sends the encoded bits to the client device and also stores a copy of these same bits in an associated memory. At decision block 53, the server-side encoder queries whether a notification of packet loss has been received from the client-side decoder. If not, the encoder continues encoding frames based on the previous client state. (Block 51)

On the other hand, if packet loss was detected and a notification received by the encoder, the server-side calculates the client state from the last known good state (before packet loss) and the decode data that the client received correctly, plus the decode data that followed the correctly received data. (Block 54) This later decode data comprises the client errors resulting from the packet loss. The process then continues at block 51, with the encoder coding the next frame based on the previous client state, with the previous client state now being that calculated from block 54.

Figure 6:
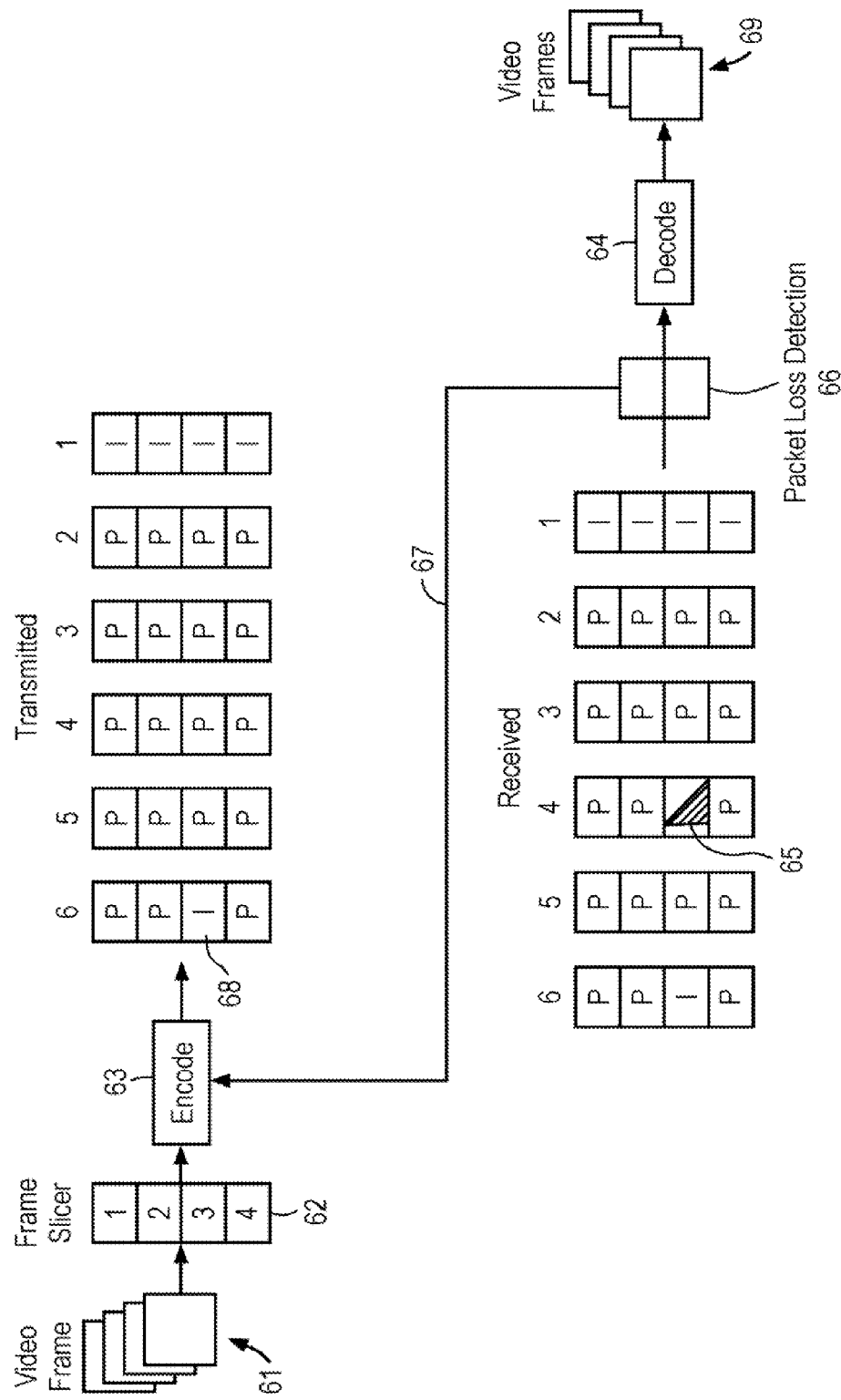
FIG. 6 is still another example network diagram illustrating an embodiment for handling packet loss.

FIG. 6 is still another example network diagram illustrating a slice-based recovery technique for overcoming packet loss. This embodiment may be used for video frames 61 that are divided into two or more slices. For instance, in this example a frame slicer 62 is shown dividing a video frame into four slices, which are then encoded by client-side encoder 63 and transmitted to the client-side decoder 64. Decoder 64 generates reconstructed video frames 69 for display on the client device.

In FIG. 6, six frames, each having four slices, are shown transmitted by encoder 63. The first frame comprises four I-slices, the second frame comprises four P-slices, the third frame comprises four P-slices, and so on. Over on the client-side, decoder 64 is shown receiving frames 1-3 without incident. However, frame 4 is shown being received with the data for the third slice, denoted by reference numeral 65, having been lost during network transmission. When lost data is detected by decoder 64, or by a packet loss detection device 66, a notification is sent back to encoder 63 via feedback channel or loop 67. In this example, the notification is received by encoder 63 immediately following transmission of frame 5, which comprises four P-slices. Responsive to the notification of lost data in the third slice, encoder encodes the next frame (frame 6) with slice 3 as an I-slice, as denoted by reference numeral 68.

The embodiment of FIG. 6 thus performs frame repair by repairing individual slices for which data has been lost. Practitioners in the art will appreciate that this embodiment has the advantage of avoiding the standard practice of insuring that a video stream contains a certain density of I-frames, which are very large and costly to transmit. Instead of sending an I-frame say, every two seconds (as in the case of DVD or on-demand video transmissions that lack feedback) the embodiment of FIG. 6 relies upon P-slice transmission for frames subsequent to the initial frame, and then implements slice-based recovery by transmitting an I-slice at the slice position where lost slice data was detected at the client device.

Practitioners will further appreciate that for optimal results, a single network packet should not contain data for more than a single slice.

Figure 7:
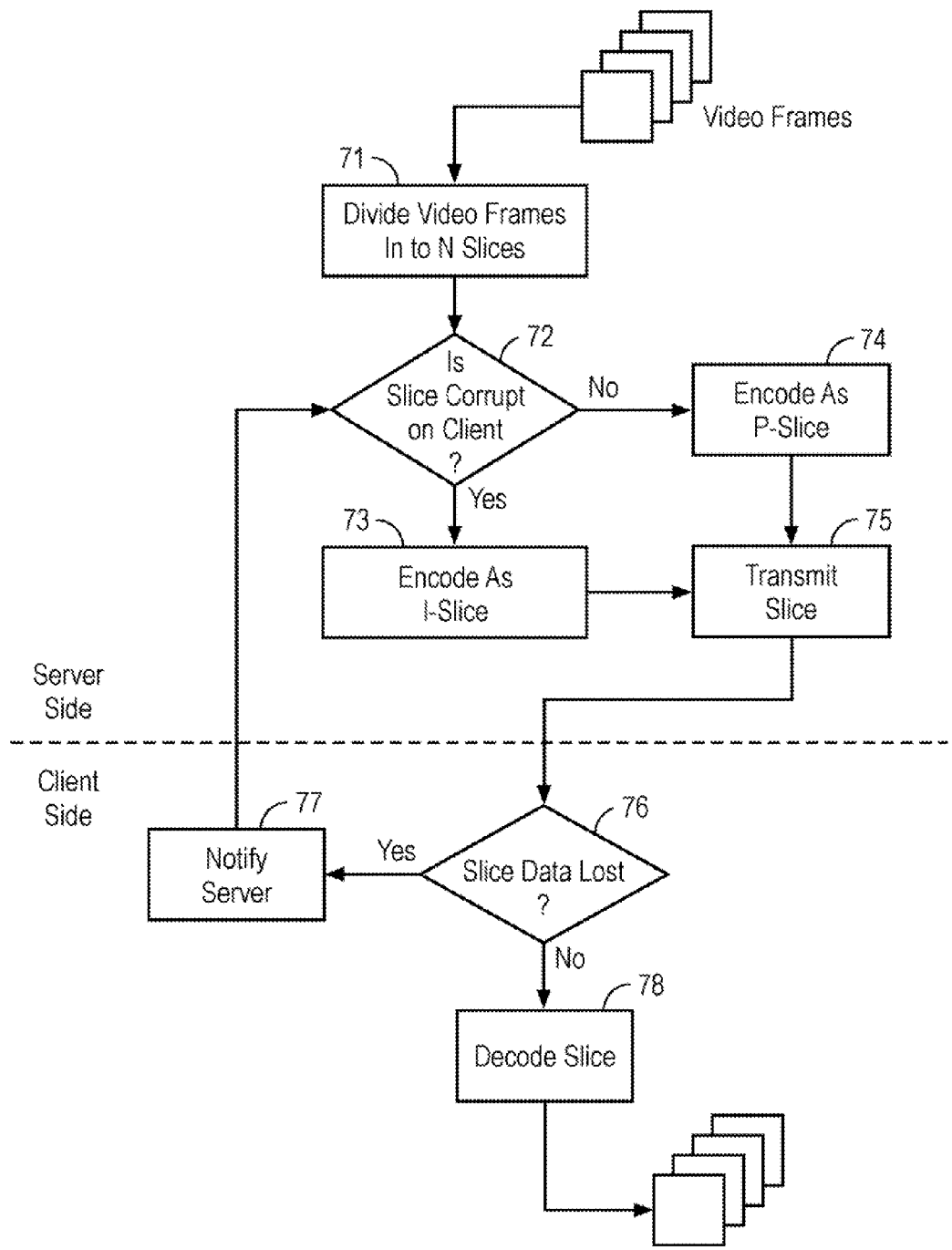
FIG. 7 is a flow diagram illustrating an example process flow for dealing with packet loss.

FIG. 7 is a flow diagram illustrating an example process flow for slice-based recovery from lost data packets. On the server-side, video frames are divided into N, where N is an integer >1, slices. (Block 71) At decision block 72, the hosting service queries whether it has received a notification from the client device indicative of a lost data slice. If no such notification has been received, it proceeds to encode each of the slices in the frame as P-slices (block 74), which are then transmitted to the client device (block 75). If, on the other hand, the hosting service has received a notification that the data of a particular slice has been lost during network transmission, the corresponding slice in the current frame is encoded as an I-slice. (Block 73) That I-slice is then transmitted over the network to the client device. (Block 74).

On the client side, incoming packets/slices may be checked for data integrity. (Block 76) If data is lost for a particular slice, the server at the hosting service center is immediately notified. (Block 77) If no data is detected lost, then each slice received is decoded (block 78) in order to reconstruct the video frames for rendering on the client-side display device.

Figure 8:
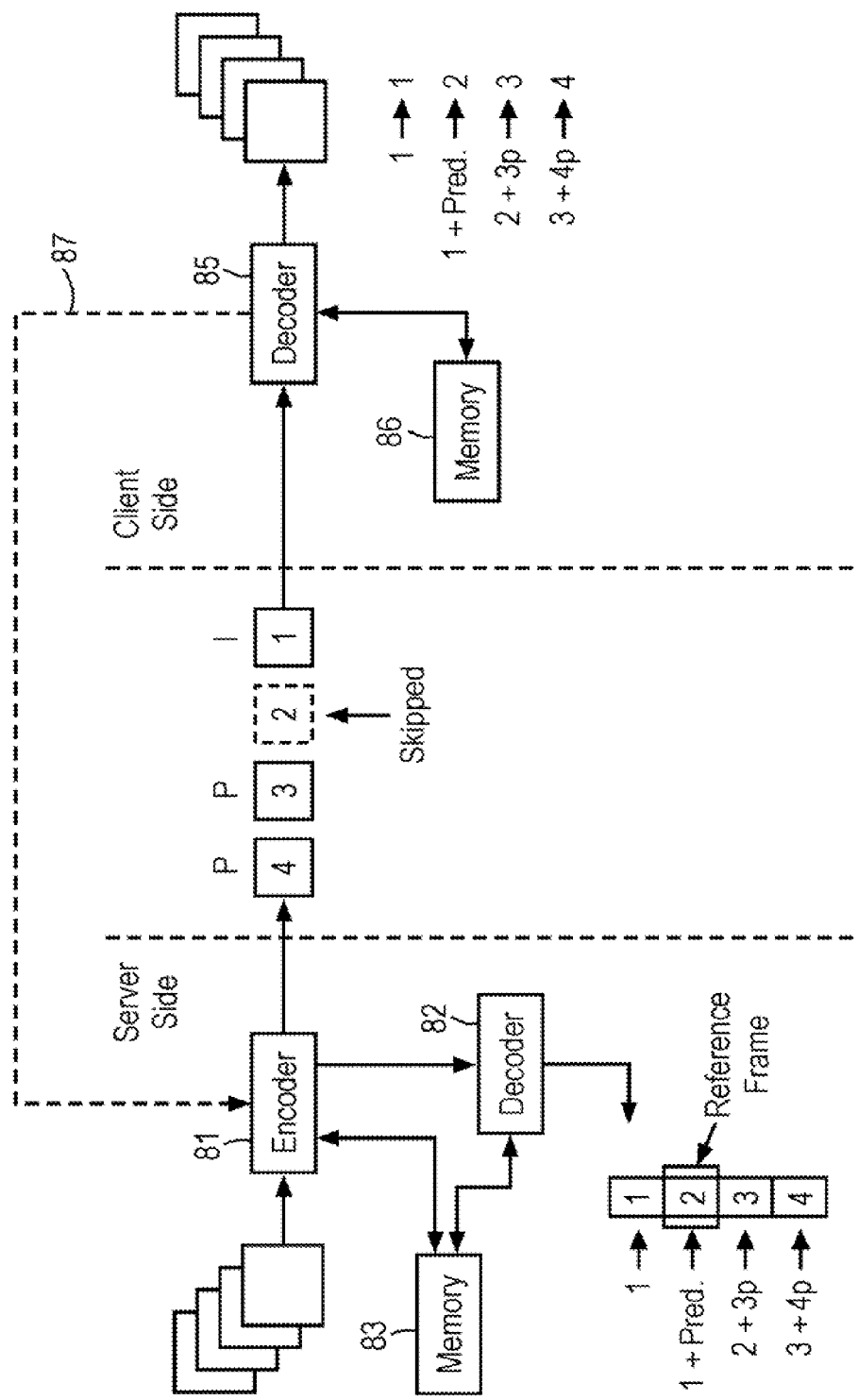
FIG. 8 an example network diagram illustrating an embodiment for client-side frame prediction.

FIG. 8 is an example network diagram illustrating an embodiment for improving perception for situations in which the server video compressor drops or skips frames because of the bandwidth budget has been, or is in danger of, being exceeded. For instance, due to a limited bandwidth budget, certain frames cannot be compressed and transmitted within the periodic interval window (e.g. $\frac{1}{60}^{th}$ second). Consequently, the video compressor may ignore the next frame it receives from the server. Note that these ignored frames are skipped over before encoding. The encoded stream is still contiguous, but the skipped frames are never encoded or transmitted, i.e. they are literally skipped over in the compressed video stream.

To minimize the visual impact of skipping frames, the embodiment of FIG. 8 employs client-side frame prediction in which a next frame is calculated based on one or more previous frame deltas (for example, in the case of motion vectors, extending the motion vectors of the previous frame received). In other words, when a frame does not arrive in time for presentation on the client device, a predicted or extrapolated frame is presented for replacement of the skipped frame in the sequence instead. In one embodiment, in the case of a skipped frame the client-side decoder re-applies the motion vectors from the last frame successfully received. In other embodiments, prediction may be based on known algorithms utilizing, say, motion vector information from more than a single historical frame in order to calculate a rate of motion change in a particular scene. That is, the accuracy of the prediction may be improved by utilizing an algorithm that utilizes motion vectors from the last several frames in the video sequence. The same approach may be applied to predict the backfill regions utilizing residuals from the previously received frames.

As shown, the server-side in FIG. 8 includes an encoder 81 coupled with a memory 83, and decoder 82. Encoded frames are shown transmitted over a network to a client device which includes a decoder 85 coupled with a memory 86, which stores and maintains state information. Similarly, memory 83 and decoder 82 are employed to maintain client-side state (on the server side) for consistency.

The example diagram of FIG. 8 shows that encoder 81 has encoded and transmitted frame 1 (I-frame), skipped frame 2, and then transmitted frames 3 & 4 (both P-frames) in sequential order. On the client-side, decoder 85 decodes frame 1 after it is received. But when frame 2 does not arrive in a timely manner, decoder 85 responds by creating a predicted reproduced video frame 2 based on the previously received motion vectors associated with frame 1. The server side employs the identical predictive algorithm to create "1+Pred→2" in order to have the same state as the client for production of frame 3. This is indicated in FIG. 8 by the notation "1+Pred.→2", where "1" and "2" indicate the reproduced frame, and the prediction may simply be to re-apply the previous motion vectors, or some other algorithm.

In another embodiment, the client device calculates the predicted frame always, and uses the predicted frame whenever the local video subsystem is ready to present a new frame, and a newly decoded frame is not yet available.

In one embodiment, client-side frame prediction of one or more reconstructed or predicted frames is used following a skipped frame based on the data (e.g., motion vectors, residuals, etc.) of one or more preceding frames. Another embodiment would be to prioritize bit allocation and/or sub-feature encoding. Encoded Network Abstraction Layer Units (NALUs) could be split into (1) motion vectors and (2) residuals. Instead of actually skipping a frame, the apparatus shown in FIG. 8 may just send minimal encoding data as prioritized. For example it could send just motion vectors if motion is prioritized.

Alternatively, encoder 81 may send a tiny packet in place of the skipped frame that simply instructs decoder 85 to reuse information such as the motion vectors of the last frame again for the current (skipped) frame. Note that a feedback loop between the client and server sides is not required in the embodiment of FIG. 8. However, a feedback loop 87 or channel may optionally be included in the example of FIG. 8 so that the client device can send a notification to the server of client-side errors that occurred during decoding. The server can then encode a new frame that corrects for the client-side errors that occurred.

Figure 9:
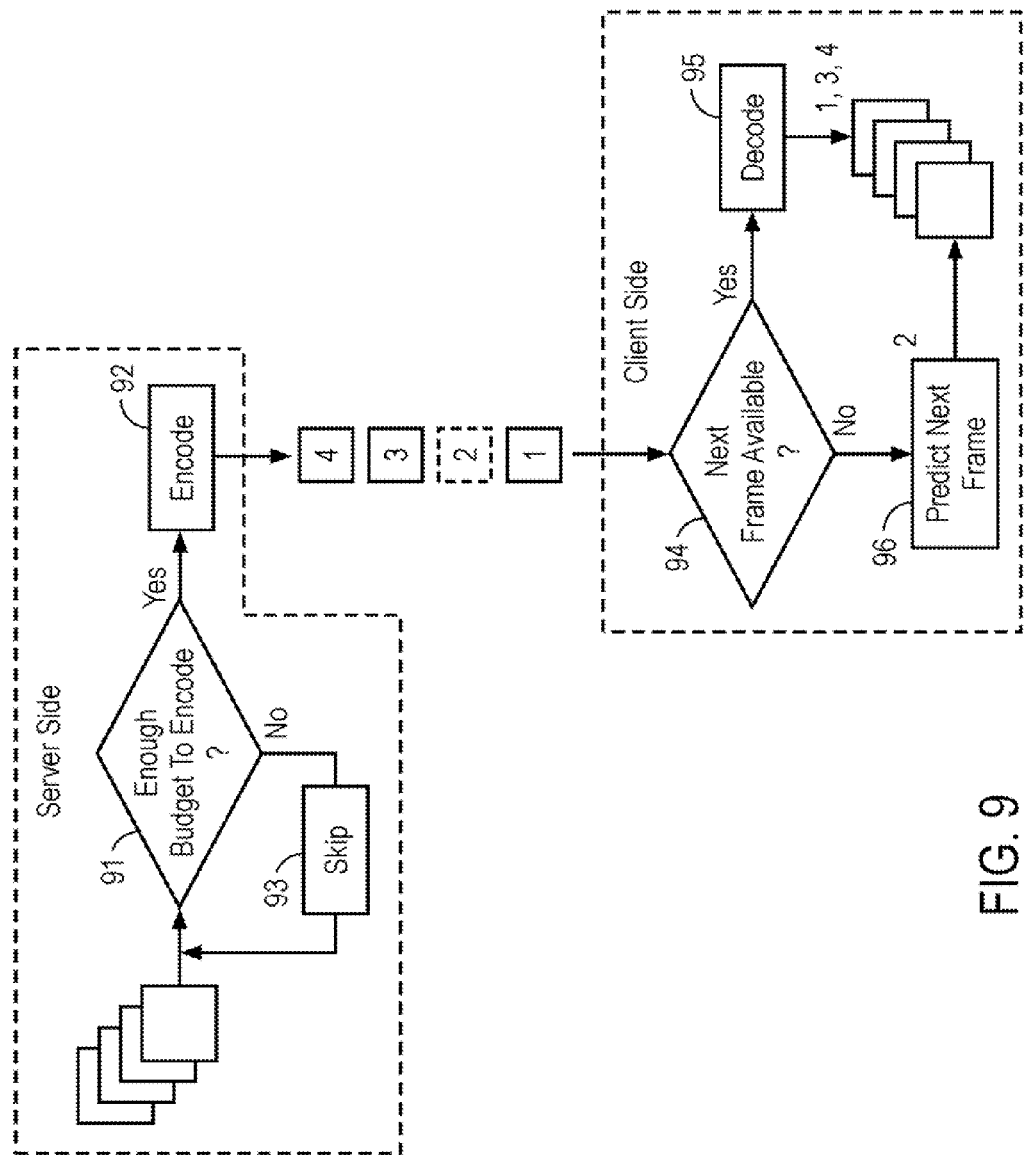
FIG. 9 is a flow diagram illustrating an example process flow for frame prediction in the case of skipped frames.

FIG. 9 is a flow diagram illustrating an example process flow for frame prediction in the case of skipped frames. The process begins on the server side when, for each video frame to be encoded, a decision is made as to whether there is enough budget (e.g., bandwidth) available to encode the current frame within a prescribed time interval (e.g., $\frac{1}{60}^{th}$ second). (Block 91) If so, the frame is encoded (block 92) and sent across the network to the client device. But if it is determined that there is insufficient budget to encode the frame, the frame is skipped (block 93) in its entirety, i.e., the frame is not coded.

On the client-side, the process continues with a query of whether a next frame is available within the prescribed time interval. (Block 94) In this example it is assumed that frame 1 (an I-frame) arrives without any problem; therefore it is decoded (block 95) to produce reconstructed video frame 1. But the second frame in the sequence is skipped; that is, the client device detects that frame 2 is not available in the current time window. This results in the client device making a prediction for frame 2. (block 96) Skipped frame 2 is followed by frames 3 & 4, each of which arrives in the prescribed frame time interval, and are decoded in a normal manner. Note that in this embodiment, the client device only calculates a predicted frame when a skipped frame has been detected. Note that the determination of whether a next frame is available may include the server sending a tiny packet or message indicating that skipped frame has occurred, along with instructions to reuse, for example, motion vectors of the last frame.

It should be understood that elements of the disclosed subject matter may also be provided as a computer program product which may include a machine-readable medium having stored thereon instructions or code which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks. ROMs, RAMs, EPROMs, EEPROMs, magnet or optical cards, or other type of machine-readable medium suitable for storing electronic instructions.

The above description of illustrated example embodiments, including what is described in the Abstract, are not intended to be exhaustive or to be limitation to the precise forms disclosed. While specific embodiments and examples of the subject matter described herein are for illustrative purposes, various equivalent modifications are possible without departing from the broader spirit and scope of the present invention.

I claim:

1. A method for delivering video over a network comprising:
    encoding, by a server, a moving picture which includes a sequence of video frames as a compressed video stream comprising an initial I-frame followed by a plurality P-frames;
    transmitting the compressed video stream over a network to a client device in a primary stream of packets containing compressed video data and a subset stream of packets containing data that includes motion vector information, wherein the client device generates a predicted frame from packets in the subset stream, the predicted frame being generated based on motion vector information from one or more previous frames decoded by the client device and uses the predicted frame if the client device is ready to present a new frame and a newly decoded frame is not yet available.

2. The method of claim 1 wherein the generating of the predicted frame comprises re-applying motion vectors from a last frame successfully received by the client device.

3. The method of claim 1 wherein the predicted frame includes one or more backfill regions predicted using residuals from the one or more previous frames.

4. The method of claim 1, wherein the subset stream is transmitted at considerably lower bit rates than the primary stream.

5. The method of claim 1 further comprising generating, by the client device, additional predicted frames following the predicted frame, each of the additional predicted frames being based on data that includes motion vectors of at least one preceding frame.

6. The method of claim 5 wherein the at least one preceding frame comprises the predicted frame.

7. The method of claim 1 further comprising sending a notification from the client device to the server via a feedback loop of client-side errors.

8. The method of claim 7 further comprising encoding, responsive to the notification, a new frame that corrects the client-side errors.

9. A method for delivering video over a network comprising:
encoding, by a server, a moving picture which includes a sequence of video frames as a compressed video stream comprising an initial I-frame followed by a plurality P-frames, the sequence having a skipped frame which is not encoded due a determination that there is insufficient bandwidth budget to encode the skipped frame within a prescribed time interval;
transmitting the compressed video stream over a network to a client device in a primary stream of packets containing compressed video data and a subset stream of packets containing data that includes motion vector information, the skipped frame not being transmitted;
transmitting, in place of the skipped frame in the sequence, a packet that instructs a decoder of the client device to reuse motion vector information from a last frame decoded by the client device to generate a predicted frame; and
generating and storing the predicted frame, by the server, using a decoder and the motion vector information, to maintain client-side state for consistency.

10. A method for delivering video over a network comprising:
encoding, by a server, a moving picture which includes a sequence of video frames as a compressed video stream comprising an initial I-frame followed by a plurality P-frames;
determining, by the server, that a current frame in the sequence cannot be encoded within a prescribed time interval of approximately $1/60^{th}$ second and within a bandwidth budget;
transmitting minimal encoding data to a client device as prioritized for the current frame in the sequence in a subset stream of packets that supplements a primary stream of packets containing compressed video data, the minimal encoding data being based on information from one or more preceding frames, wherein the client device is configured to generate a predicted frame using a client-side decoder if the client device is ready to present a new frame and a newly decoded frame is not yet available; and
generating and storing the predicted frame, by the server, using a server-side decoder and the minimal encoding data, to maintain client-side state for consistency.

11. The method of claim 10 wherein the minimal encoding data comprise motion vectors.

12. A method for delivering video over a network comprising:
encoding, by a server, a moving picture which includes a sequence of video frames as a compressed video stream transmitted to a client device, the compressed video stream comprising an initial I-frame followed by a plurality P-frames;
determining, by the server, that a current frame in the sequence cannot be encoded within a prescribed time interval;
skipping the current frame such that the current frame becomes a skipped frame that is not encoded;
transmitting a packet to the client device which indicates that a current frame is skipped, wherein the packet includes residual information and wherein the packet is a packet in a subset stream of packets that supplements a primary stream of packets containing compressed video data and wherein the client device uses the packet and a client-side decoder to generate a predicted frame that replaces the skipped frame in the compressed video stream if the client device is ready to present a new frame and a newly decoded frame is not yet; and
generating and storing the predicted frame, by the server, using a server-side decoder, to maintain client-side state for consistency.

13. The method of claim 12 wherein the packet includes the motion vector information.

14. The method of claim 12 wherein the motion vector information comprises motion vectors from one or more previous frames decoded by the client device.

* * * * *